(12) United States Patent
Wu

(10) Patent No.: US 8,204,283 B2
(45) Date of Patent: Jun. 19, 2012

(54) FINGERPRINT INPUT MODULE

(75) Inventor: Jen-Chieh Wu, Linsen Road (TW)

(73) Assignee: Gingy Technology Inc., Hsinchu (TW)

( * ) Notice: Subject to any disclaimer, the term of this patent is extended or adjusted under 35 U.S.C. 154(b) by 781 days.

(21) Appl. No.: 12/321,255

(22) Filed: Jan. 16, 2009

(65) Prior Publication Data
US 2010/0183200 A1 Jul. 22, 2010

(51) Int. Cl.
*G06K 9/00* (2006.01)
(52) U.S. Cl. .......... 382/124; 382/127; 382/141; 257/98; 257/E33.059
(58) Field of Classification Search .................. 382/124, 382/127, 141; 257/98, E33.059
See application file for complete search history.

(56) References Cited

U.S. PATENT DOCUMENTS

| 5,796,858 A | 8/1998 | Zhou et al. |
| 6,665,427 B1 * | 12/2003 | Keagy et al. .................. 382/124 |
| 2006/0202104 A1 * | 9/2006 | Gurevich et al. .......... 250/208.1 |
| 2009/0147365 A1 * | 6/2009 | Inokuma et al. .............. 359/599 |

* cited by examiner

*Primary Examiner* — Samir Ahmed
*Assistant Examiner* — Ruiping Li
(74) *Attorney, Agent, or Firm* — Morris Manning & Martin LLP; Tim Tingkang Xia, Esq.

(57) ABSTRACT

A fingerprint input module includes at least one prism sheet, an image-capturing unit, and a planar light source. The prism sheet has a micro-prism array. The image-capturing unit has a lens. The planar light source is disposed between the prism sheet and the image-capturing unit, and has a through hole in optical alignment with the lens for passage of light from the micro-prism array to the lens.

11 Claims, 7 Drawing Sheets

FINGERPRINT INPUT MODULE

BACKGROUND OF THE INVENTION

1. Field of the Invention

The invention relates to a fingerprint input module, more particularly to a fingerprint input module having an improved assembly accuracy and an increased yield.

2. Description of the Related Art

Referring to FIG. 1, a conventional fingerprint sensing system 1 disclosed in U.S. Pat. No. 5,796,858 includes a light source 11 for emitting light, a sheet prism 12, and an image-capturing unit 13. The sheet prism 12 includes a plurality of prismlets 121 extending in identical directions and a sensing surface 122 for contacting a finger to be sensed. The image-capturing unit 13 includes a lens 131 for collecting the light reflected from the sheet prism 12, and a detector array 132 for transforming the light from the lens 131 into an image signal. When the light from the light source 11 illuminates the finger disposed on the sensing surface 122 through the sheet prism 12, the light illuminating the grooves of the finger is reflected from the sensing surface 122 to the image-capturing unit 13 through total internal reflection, and the light illuminating the ridges of the finger will be absorbed by the finger. The light reflected from the sensing surface 122 is focused by the lens 131 to create a fingerprint image, which is dark where there are ridges and bright where there are grooves, on the detector array 132.

However, in the conventional fingerprint sensing system 1, in order to permit the light from the light source 11 to be refracted into the prismlets 121 at accurate angles for creating the total internal refection, the assembly angle of the light source 11 is strictly limited. Furthermore, in order to permit the light reflected from the sensing surface 122 through the total internal reflection to enter into the image-capturing unit 13 at an accurate angle for preventing aberrations, the assembly angles of the lens 131 and the detector array 132 should also be strictly limited. Therefore, the yield of the fingerprint sensing system 1 may be reduced due to the error of the assembly angles of the light source 11, the lens 131, and/or the detector array 132.

SUMMARY OF THE INVENTION

Therefore, an object of the present invention is to provide a fingerprint input module having an improved assembly accuracy and an increased yield.

Accordingly, the fingerprint input module of this invention includes at least one prism sheet, an image-capturing unit, and a planar light source. The prism sheet has a micro-prism array. The image-capturing unit has a lens. The planar light source is disposed between the prism sheet and the image-capturing unit, and has a through hole in optical alignment with the lens for passage of light from the micro-prism array to the lens.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
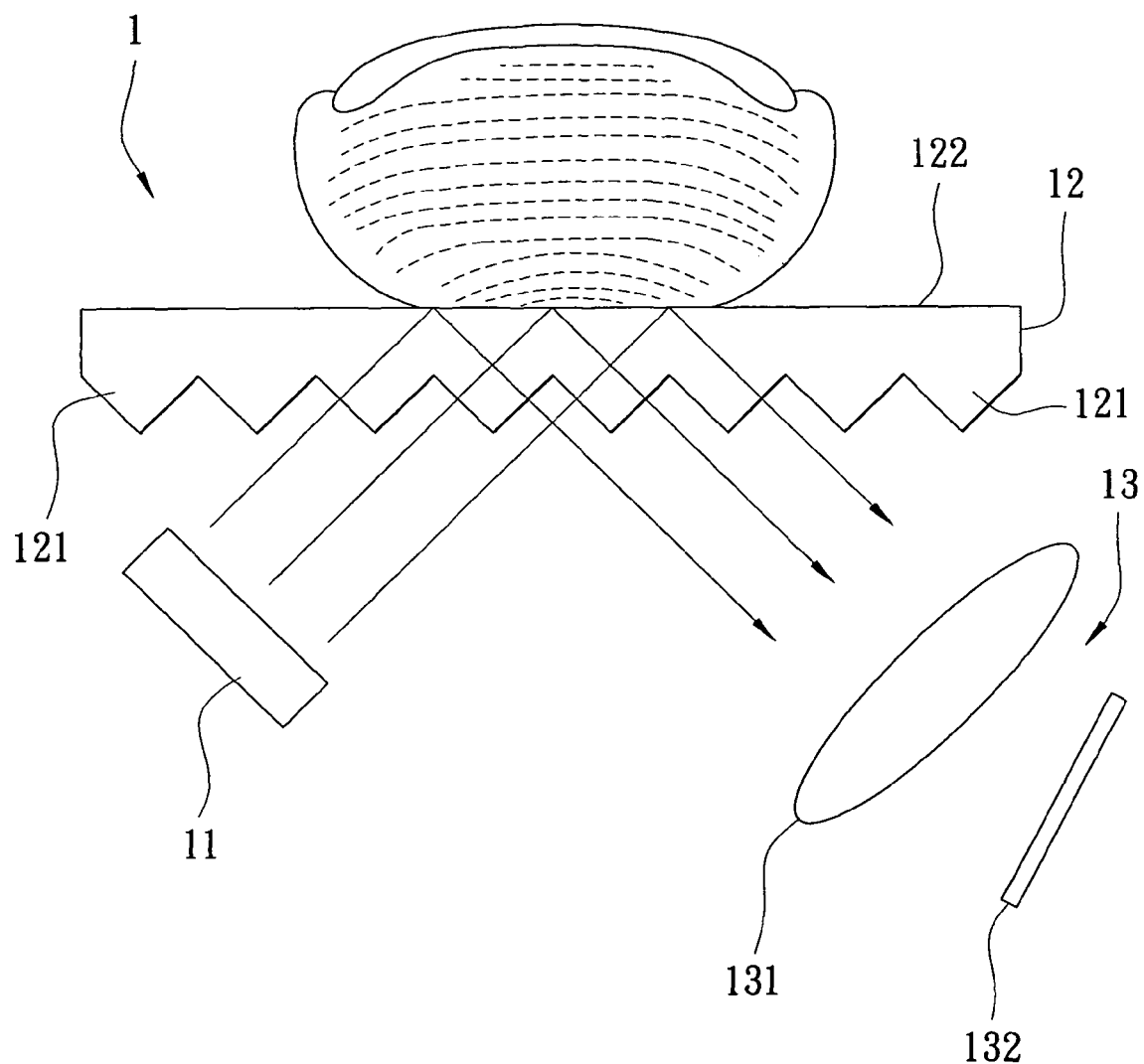
FIG. 1 is a schematic diagram of a conventional fingerprint sensing system.

Before the present invention is described in greater detail, it should be noted that like elements are denoted by the same reference numerals throughout the disclosure. It should be noted herein that the elements of the preferred embodiments are not drawn to scale in the accompanying drawings for the sake of clarity.

Figure 2:
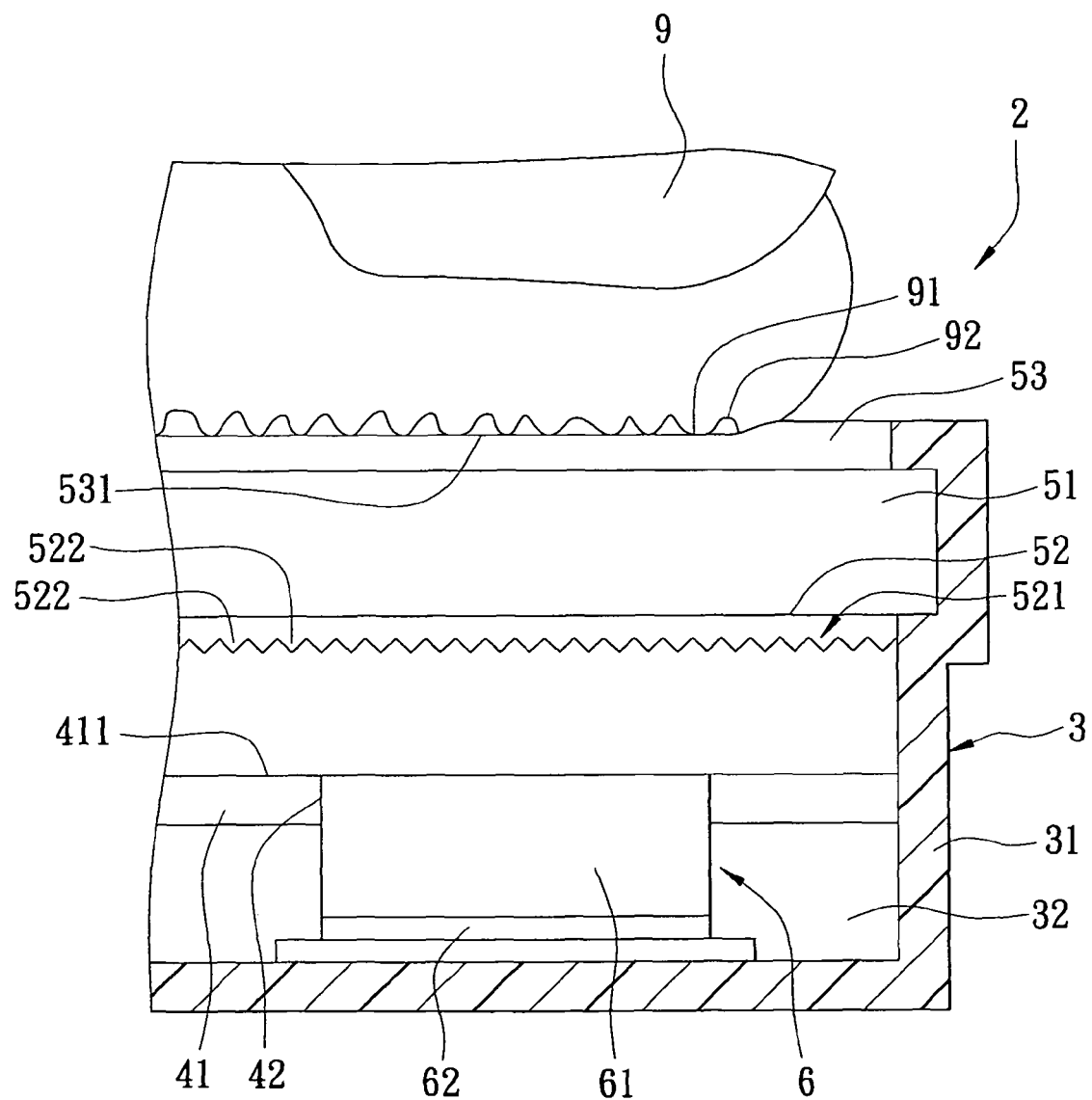
FIG. 2 is a fragmentary partly sectional view of a first preferred embodiment of a fingerprint input module according to this invention.

Referring to FIG. 2, the first preferred embodiment of a fingerprint input module 2 according to this invention is useful for inputting a fingerprint of a finger 9 composed of a plurality of ridges 91 and a plurality of grooves 92. The fingerprint input module 2 includes a housing 3, a light-transmissive substrate 51, a prism sheet 52, a light-transmissive flexible optical film 53, an image-capturing unit 6, and a planar light source 41.

The housing 3 includes a shell body 31 defining a receiving space 32.

The light-transmissive substrate 51 and the prism sheet 52 are disposed in the receiving space 32 of the housing 3. The light-transmissive substrate 51 supports the prism sheet 52. The prism sheet 52 has a micro-prism array 521 formed at one side of the prism sheet 52 and facing toward the planar light source 41. In this preferred embodiment, the prism sheet 52 is a brightness enhancement film adhered on the light-transmissive substrate 51. The micro-prism array 521 of the prism sheet 52 includes a plurality of prismlets 522 extending substantially parallel to each other. In the preferred embodiment, the prismlets 522 are configured with a sawtooth shaped cross-section. It should be noted that the micro-prism array 521 of the prism sheet 52 can be configured to have other geometric shapes. The light-transmissive flexible optical film 53 is disposed on the light-transmissive substrate 51 opposite to the micro-prism array 521, and has a top surface 531 adapted for contacting the finger 9. The light-transmissive flexible optical film 53 is made of a light-transmissive flexible material, such as fluorinated polyethylene (FPE).

The image-capturing unit 6 includes a lens 61, and an image sensor 62 disposed in proximity to the lens 61.

The planar light source 41 is disposed between the prism sheet 52 and the image-capturing unit 6 in the receiving space 32 of the housing 3, and has a through hole 42 in optical alignment with the lens 61 for passage of light from the micro-prism array 521 to the lens 61. Furthermore, the planar light source 41 has a light-emitting face 411 substantially parallel to the prism sheet 52. In this preferred embodiment, the planar light source 41 is made of an electroluminescent component. Alternatively, the planar light source 41 can be made of a backlight module including a light-emitting element and a light-guiding plate. The lens 61 collects and focuses the light passing through the through hole 42 onto the image sensor 62 to form a fingerprint image. The image sensor 62 then transforms the fingerprint image into an image signal.

Figure 3:
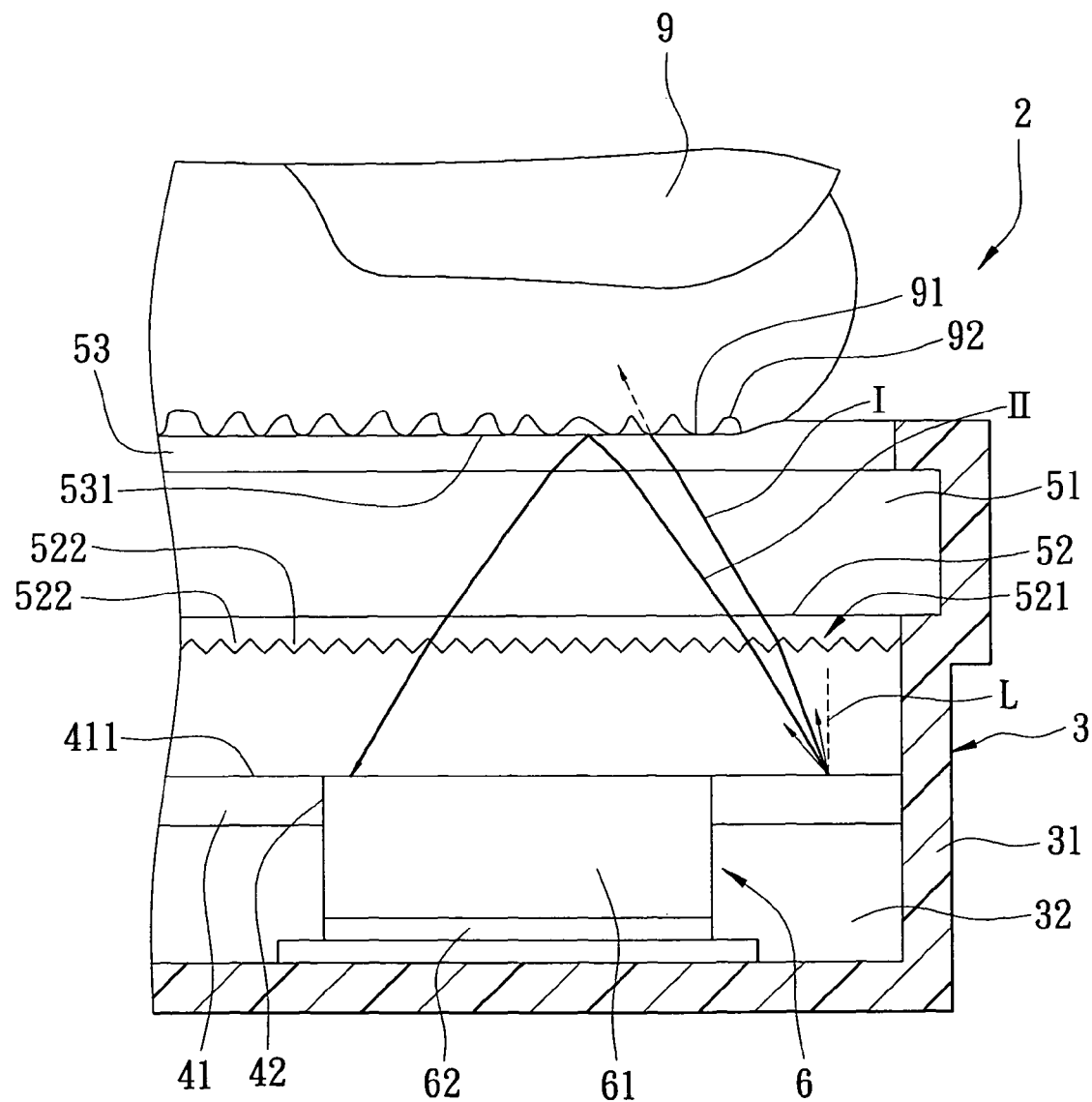
FIG. 3 is a fragmentary partly sectional view of the first preferred embodiment illustrating the pathway of light in this embodiment.

Referring to FIG. 3, the finger 9 to be sensed is disposed on the top surface 531 of the light-transmissive flexible optical film 53. Since the light-transmissive flexible optical film 53 is made of a flexible material, it can be depressed when the finger 9 is disposed thereon. Therefore, the ridges 91 of the finger 9 have a greater contact area with the top surface 531 of the light-transmissive flexible optical film 53 so as to obtain a clearer fingerprint image.

As illustrated in FIG. 3, when the light (I) from the planar light source 41 is refracted into the prism sheet 52, passes through the light-transmissive substrate 51 and the light-transmissive flexible optical film 53, and illuminates the ridges 91 of the finger 9, the light (I) will be absorbed by the finger 9, and thus can not be reflected to the image sensor 62. In contrast, when the light (II) from the planar light source 41 is refracted into the prism sheet 52, passes through the light-transmissive substrate 51 and the light-transmissive flexible optical film 53, and illuminates the grooves 92 of the finger 9, the light (II) will be reflected from the top surface 531 of the light-transmissive flexible optical film 53 through total internal reflection due to air present in the grooves 92 of the finger 9. The light (II) reflected from the top surface 531 of the light-transmissive flexible optical film 53 then passes through the light-transmissive flexible optical film 53 and the light-transmissive substrate 51, is refracted through the prism sheet 52, passes through the through hole 42, is collected and focused by the lens 61, and finally reaches the image sensor 62. Therefore, a fingerprint image can be formed by the image sensor 62, which is dark where there are the ridges 91 and bright where there are the grooves 92.

Figure 4:
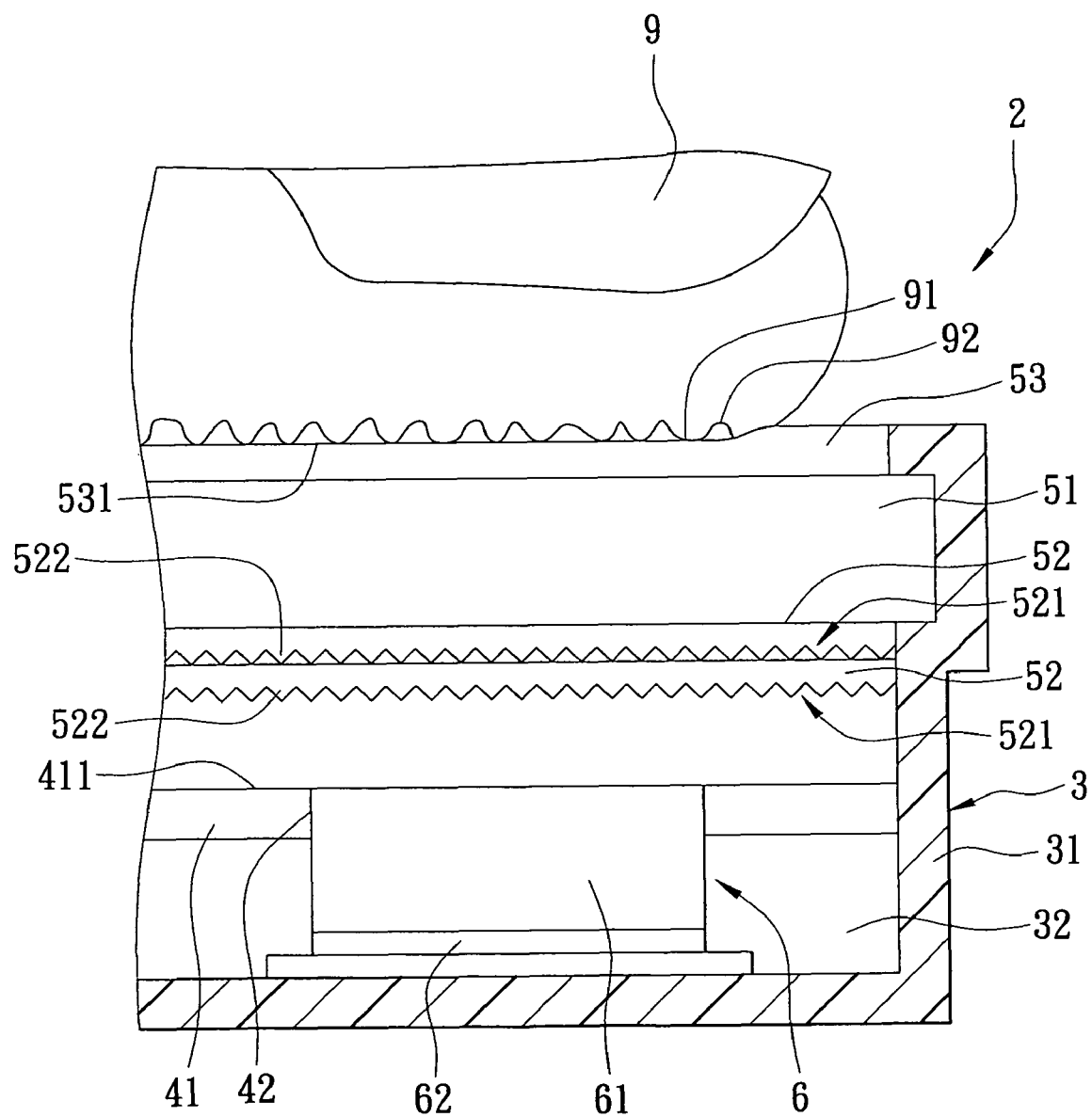
FIG. 4 is a fragmentary partly sectional view of a second preferred embodiment of a fingerprint input module according to this invention.
Figure 5:
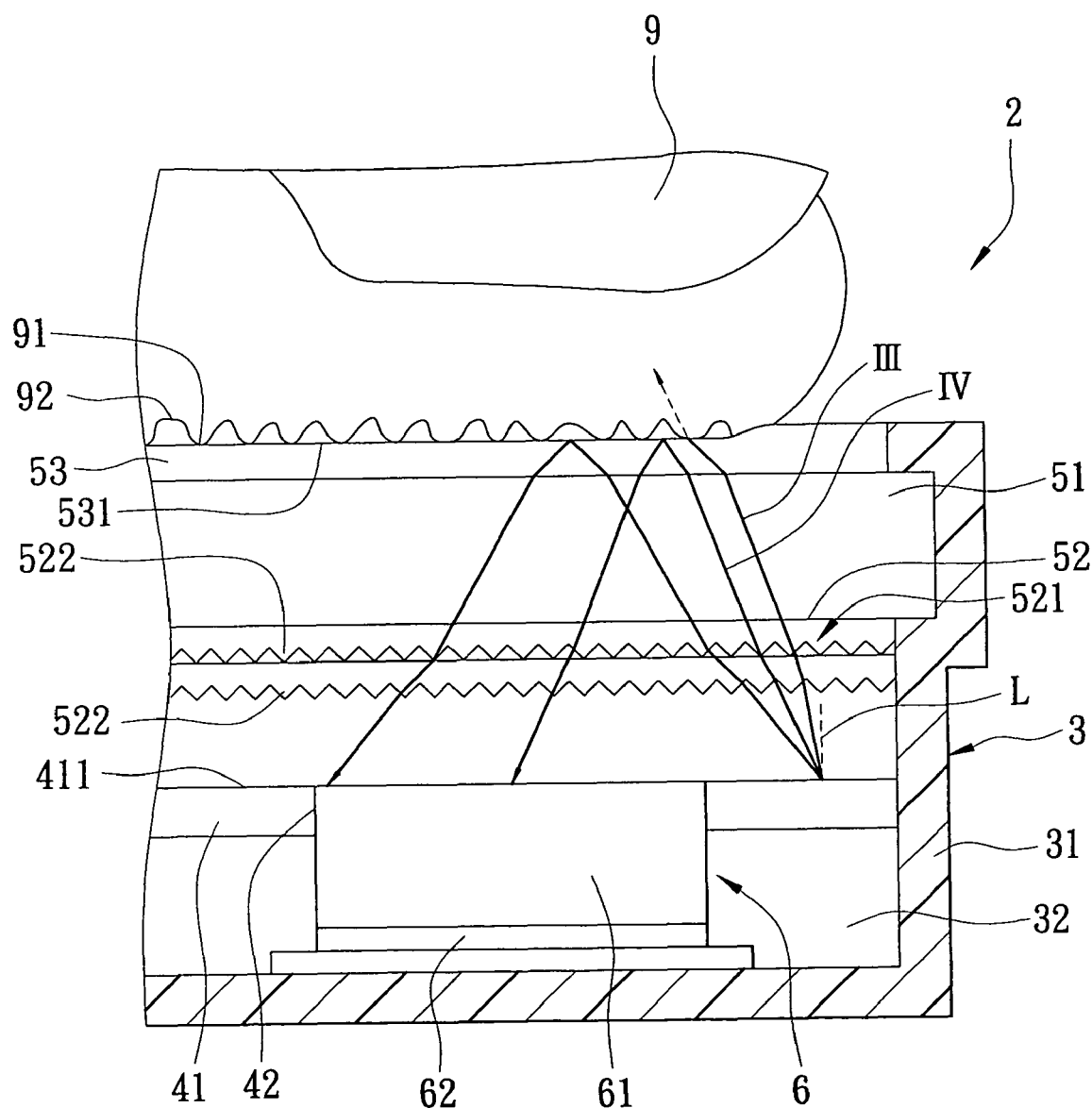
FIG. 5 is a fragmentary partly sectional view of the second preferred embodiment illustrating the pathway of light in this embodiment.

Referring to FIGS. 4 and 5, the second preferred embodiment of a fingerprint input module 2 according to this invention is shown to be substantially similar to the first preferred embodiment except that two of the prism sheets 52 are stacked and each of the prism sheets 52 has a micro-prism array 521 facing toward the planar light source 41. With two of the prism sheets 52, the illumination angle of the light (III, IV) from the L-axis is relatively small as compared to the illumination angle of the light (I, II) from the L-axis in the first preferred embodiment. Therefore, in the second preferred embodiment, a relatively large range of the light from the planar light source 41 can illuminate the top surface 531 of the light-transmissive flexible optical film 53, and a better quality of the fingerprint image can be obtained as compared to the first preferred embodiment.

It should be noted that the aforesaid effect of the second preferred embodiment can be obtained by the prism sheets 52 which are respectively disposed on two opposite sides of the light-transmissive substrate 51 and face toward the planar light source 41.

Figure 6:
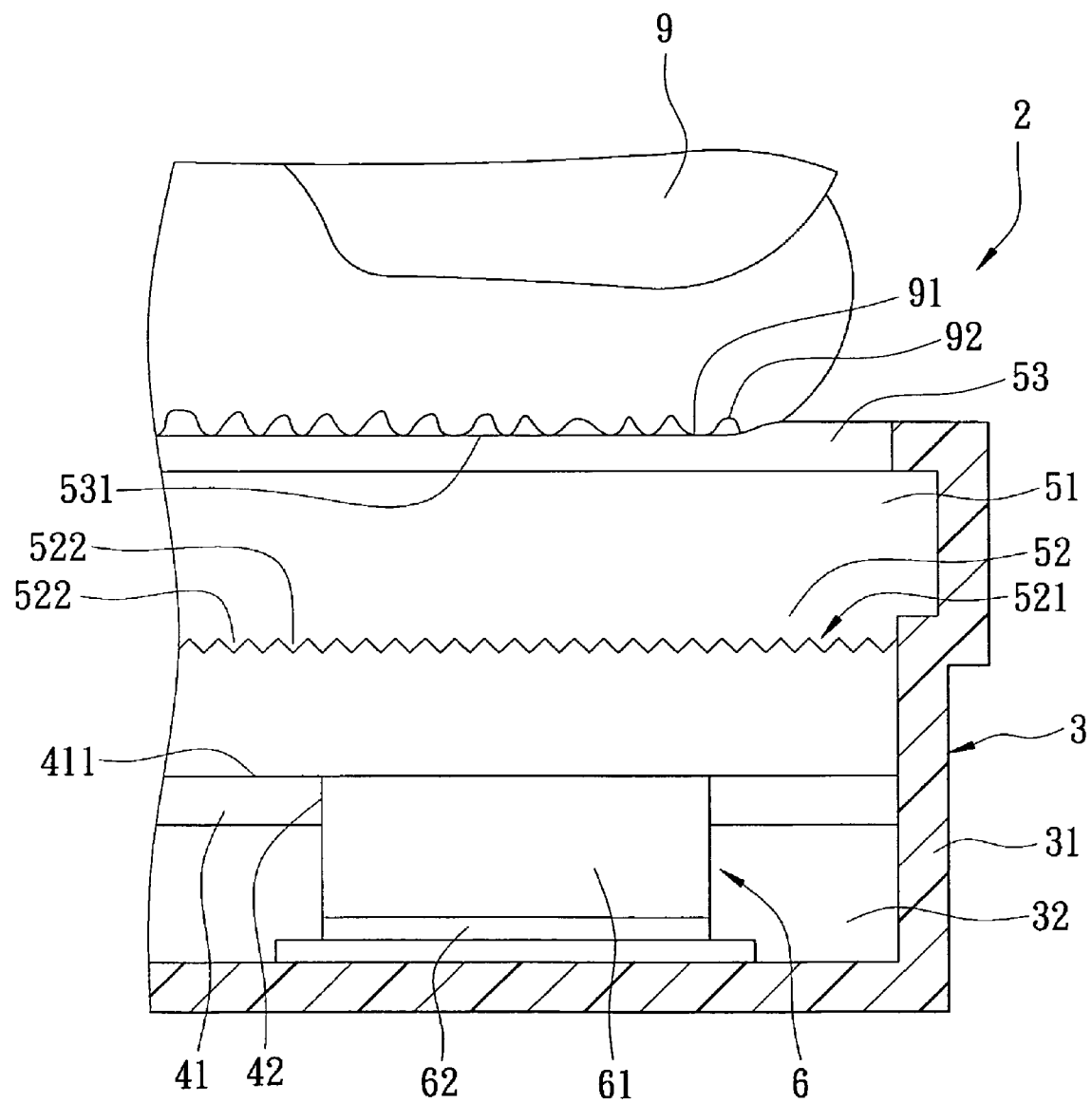
FIG. 6 is a fragmentary partly sectional view of a third preferred embodiment of a fingerprint input module according to this invention.

Referring to FIG. 6, the third preferred embodiment of a fingerprint input module 2 according to this invention is shown to be substantially similar to the first preferred embodiment except that the light-transmissive flexible optical film 53 is directly disposed on the prism sheet 52 opposite to the micro-prism array 521.

Figure 7:
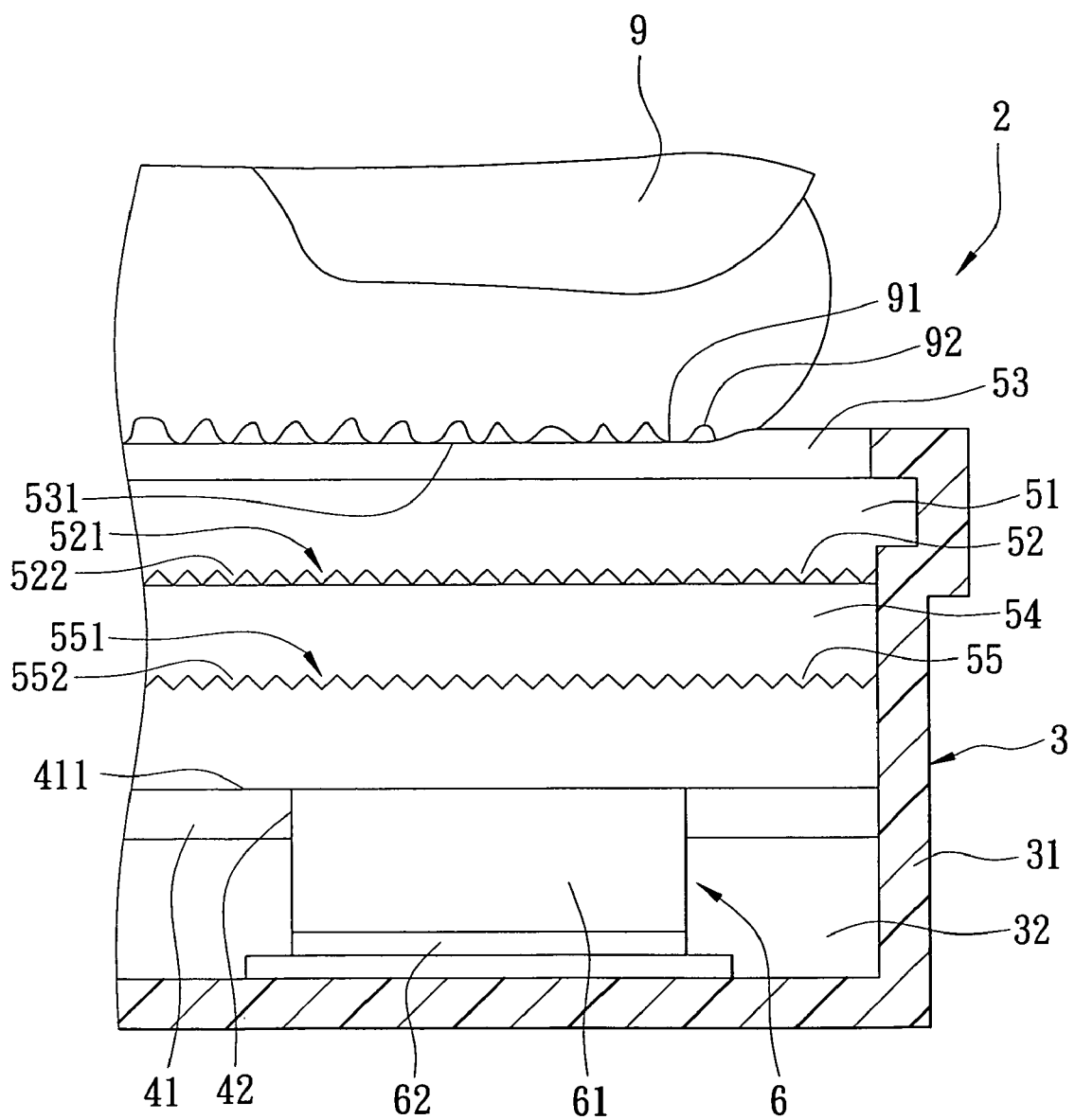
FIG. 7 is a fragmentary partly sectional view of a fourth preferred embodiment of a fingerprint input module according to this invention.

Referring to FIG. 7, the fourth preferred embodiment of a fingerprint input module 2 according to this invention is shown to be substantially similar to the third preferred embodiment except that two of the prism sheets 52 are stacked and each of the prism sheets 52 has a micro-prism array 521 facing toward the planar light source 41.

It should be noted that the size of the fingerprint input module 2 of the present invention can be enlarged to sense a palm.

In view of the above description, the fingerprint input module 2 of the present invention has the following advantages:

1. In the fingerprint input module 2 of the present invention, the planar light source 41 is disposed between the prism sheet 52 and the image-capturing unit 6, and the light-emitting face 411 of the planar light source 41 is substantially parallel to the prism sheet 52. Therefore, the disadvantages due to the error of the assembly angles of the light source 11, the lens 131, and/or the detector array 132 in the aforementioned prior art can be avoided. An improved assembly accuracy and an increased yield can be attained by the fingerprint input module of the present invention.

2. Since the light-transmissive flexible optical film 53 is made of a flexible material, it can be depressed when the finger 9 is disposed thereon. Therefore, the ridges 91 of the finger 9 have a greater contact area with the top surface 531 of the light-transmissive flexible optical film 53 so as to obtain a clearer fingerprint image.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A fingerprint input module, comprising:
   at least one prism sheet having a micro-prism array;
   an image-capturing unit having a lens and an image sensor disposed in proximity to said lens; and
   a light source module disposed between said prism sheet and said image sensor and having a through hole which said lens disposes in for passage of light from said micro-prism array to said lens.

2. The fingerprint input module as claimed in claim 1, wherein said light source module has a light-emitting face substantially parallel to said prism sheet.

3. The fingerprint input module as claimed in claim 1, wherein said micro-prism array faces toward said light source module.

4. The fingerprint input module as claimed in claim 1, wherein said micro-prism array includes a plurality of prismlets extending substantially parallel to each other.

5. The fingerprint input module as claimed in claim 1, wherein a plurality of said prism sheets are stacked and face toward said light source module.

6. The fingerprint input module as claimed in claim 1, further comprising a light-transmissive flexible optical film disposed on said prism sheet opposite to said micro-prism array and adapted for contacting a finger.

7. The fingerprint input module as claimed in claim 1, wherein said prism sheet is a brightness enhancement film.

8. The fingerprint input module as claimed in claim 1, wherein said image-capturing unit further includes an image sensor disposed in proximity to said lens.

9. The fingerprint input module as claimed in claim 1, wherein said light source module includes a light-emitting element and a light-guiding plate.

10. The fingerprint input module as claimed in claim 1, further comprising a light-transmissive substrate supporting said prism sheet.

11. The fingerprint input module as claimed in claim 10, further comprising a light-transmissive flexible optical film disposed on said light-transmissive substrate opposite to said micro-prism array and adapted for contacting a finger.

* * * * *